(12) United States Patent
Krenz et al.

(10) Patent No.: US 8,435,618 B2
(45) Date of Patent: May 7, 2013

(54) MULTI-COMPONENT INJECTION-MOLDED PART WITH MATERIAL-LOCKING SEALING

(75) Inventors: Guenter Krenz, Steinheim (DE); Gerold Kohlberger, Rettenberg-Freidorf (DE); Alexander Ziegler, Esslingen (DE); Bjoern Billep, Abtsgmuend (DE); Wolf-Ingo Ratzel, Stuttgart (DE); Bernd Beiermeister, Steinheim-Kleinbottwar (DE); Zdenek Frcek, Kamenny Ujezd (CZ); Vaclav Straus, Ceske Budejovice (CZ)

(73) Assignee: Robert Bosch GmbH, Stuttgart (DE)

( * ) Notice: Subject to any disclaimer, the term of this patent is extended or adjusted under 35 U.S.C. 154(b) by 230 days.

(21) Appl. No.: 12/747,964

(22) PCT Filed: Nov. 11, 2008

(86) PCT No.: PCT/EP2008/065302
§ 371 (c)(1),
(2), (4) Date: Jun. 14, 2010

(87) PCT Pub. No.: WO2009/077269
PCT Pub. Date: Jun. 25, 2009

(65) Prior Publication Data
US 2010/0266849 A1    Oct. 21, 2010

(30) Foreign Application Priority Data

Dec. 14, 2007    (DE) .......................... 10 2007 060 394

(51) Int. Cl.
*B32B 3/30*    (2006.01)

(52) U.S. Cl.
USPC ............................................. 428/57; 428/119

(58) Field of Classification Search ................... 428/57, 428/119; 264/274; 403/267
See application file for complete search history.

(56) References Cited

U.S. PATENT DOCUMENTS

| 5,131,778 A | 7/1992 | Asai et al. |
| 5,153,052 A | 10/1992 | Tanaka et al. |
| 6,641,769 B1 | 11/2003 | Huntimer |

(Continued)

FOREIGN PATENT DOCUMENTS

| CN | 85204026 | 6/1986 |
| CN | 85102205 | 7/1986 |

(Continued)

OTHER PUBLICATIONS

Partial translation of DE 3642246 A1 retrieved Nov. 2012.*

*Primary Examiner* — Alexander Thomas
(74) *Attorney, Agent, or Firm* — Michael Best & Friedrich LLP

(57) ABSTRACT

An injection-molded part according to the invention has at least one thermoplastic inlay part and one thermoplastic composite element injection-molded onto the inlay part. The at least one inlay part on its boundary face with the composite element has at least one raised feature for material-locking sealing between the inlay part and the composite element. The raised feature protrudes with a height H1 into the composite element and forms a narrowed cross section in the composite element having a height H2. The at least one raised feature, on its flux leading end, has a first chamfer, and the ratio of the height of the narrowed cross section to the height of the raised feature is in the range between 0.6 and 0.9.

18 Claims, 3 Drawing Sheets

U.S. PATENT DOCUMENTS

| | | | |
|---|---|---|---|
| 6,793,870 B1 | 9/2004 | Brodesser et al. | |
| 6,858,276 B1 * | 2/2005 | Chomier et al. | 428/35.7 |
| 2003/0217776 A1 | 11/2003 | Kulmann et al. | |
| 2007/0035373 A1 | 2/2007 | Henry et al. | |
| 2008/0036564 A1 | 2/2008 | Henry et al. | |

FOREIGN PATENT DOCUMENTS

| | | |
|---|---|---|
| DE | 3642246 A1 | 6/1988 |
| DE | 3820814 A1 | 1/1989 |
| EP | 1348875 A1 | 10/2003 |
| EP | 1614518 A2 | 1/2006 |
| EP | 1755133 A2 | 2/2007 |
| JP | 56114985 A | 9/1981 |
| JP | 1029226 | 1/1989 |
| JP | 5329880 | 12/1993 |
| JP | 8121669 A | 5/1996 |
| JP | 2002200643 | 7/2002 |
| WO | 2005061203 A2 | 7/2005 |

* cited by examiner

MULTI-COMPONENT INJECTION-MOLDED PART WITH MATERIAL-LOCKING SEALING

CROSS-REFERENCE TO RELATED APPLICATION

This application is a 35 USC 371 application of PCT/EP2008/065302 filed on Nov. 11, 2008.

BACKGROUND OF THE INVENTION

1. Field of the Invention

The invention is based on an injection-molded part.

2. Description of the Prior Art

Injection-molded parts are already known having at least one thermoplastic inlay part and one thermoplastic composite element injection-molded onto the inlay part, the at least one inlay part on its boundary face with the composite element having at least one raised feature for material-locking sealing between the inlay part and the composite element, which raised feature protrudes with a height H1 into the composite element and forms a narrowed cross section in the composite element having a height H2. The injection-molded part is produced by an injection molding process, in which the inlay part is placed in an injection mold, and a composite element is injection-molded onto it. The raised features are intended to be fused by the melt of the composite element, so that a material-locking, gastight connection is achieved. However, it is disadvantageous that as a rule the raised features are constructed with sharp edges perpendicular to the boundary face and become only partially fused if all, since often not enough melting energy from the melt as it spills over the raised feature is available to the raised features. The raised feature forms a bottleneck for the flux, but this bottleneck is not small enough for good replenishment of melt and for a good heat transfer from the melt to the raised feature. The ratio of the height H2 to the H1 is typically substantially greater than 1.5. Since the raised features do not reliably fuse, the known injection-molded parts have a plurality of raised features disposed one after the other in the flux direction, in order to achieve gas tightness of the connection. However, this provision requires a great deal of installation space, which is often not available.

ADVANTAGES AND SUMMARY OF THE INVENTION

The injection-molded part according to the invention has the advantage over the prior art that the supply of heat to the raised feature and the direct heat transfer from the melt to the raised feature are improved, and thus reliable fusing of the raised feature is achieved because the at least one raised feature, on its flux leading end, has a first chamfer, and the ratio of the height of the narrowed cross section to the height of the raised feature is in the range between 0.6 and 0.9.

The constriction between the raised feature of the inlay part and the injection mold having the height H2 is reduced compared to the prior art, so that improved heat transfer, particularly at the peak of the raised feature, is achieved. By means of the embodiment according to the invention, a continuous increase in the holdup action of the raised feature in the flux direction is attained, along with compensation for the raised feature, given a leading edge direction other than 90° of the melt. Moreover, dead zones in the flow and attendant gas inclusions are avoided. Furthermore, the surface area of the raised features is increased according to the invention.

In a first advantageous embodiment, the first chamfer of the at least one raised feature has an angle between 5° and 45° relative to an axis that is perpendicular to the boundary face of the inlay part.

In a second advantageous embodiment, the first chamfer of the at least one raised feature has an angle between 15° and 35° relative to an axis that is perpendicular to the boundary face of the inlay part, since the head of the raised feature in this embodiment has less mass and therefore begins to fuse more easily.

It is highly advantageous if the at least raised feature has a second chamfer on its flux trailing end, since in this way the flow guidance is improved and as a result gas inclusions are avoided.

It is also advantageous if the second chamfer extends more shallowly than the first chamfer.

In an advantageous embodiment, the second chamfer of the at least one raised feature has an angle between 50° and 75° relative to an axis that is perpendicular to the boundary face of the inlay part.

It is furthermore advantageous if, as viewed in the flux direction, only a single raised feature is provided. Particularly in the case of a cylindrical injection-molded part whose form-locking connection between the inlay part and the composite element is supposed to be gastight, a single annular raised feature suffices, thus economizing on installation space compared to a plurality of successively disposed raised features. In this way, the composite component can be made smaller. Furthermore, the production costs for the composite component are reduced.

It is also advantageous if the inlay part is produced from a first plastic and the composite element is produced from a second plastic, and the first plastic and/or the second plastic has a crystalline proportion of at least 35%. For instance, the first plastic and/or the second plastic is a polyamide, PPS, POM, or PEEK.

BRIEF DESCRIPTION OF THE DRAWINGS

Exemplary embodiments of the invention are shown in simplified form in the drawings and described in further detail in the ensuing description in conjunction with the drawings, in which.

DESCRIPTION OF THE PREFERRED EMBODIMENTS

Figure 1:
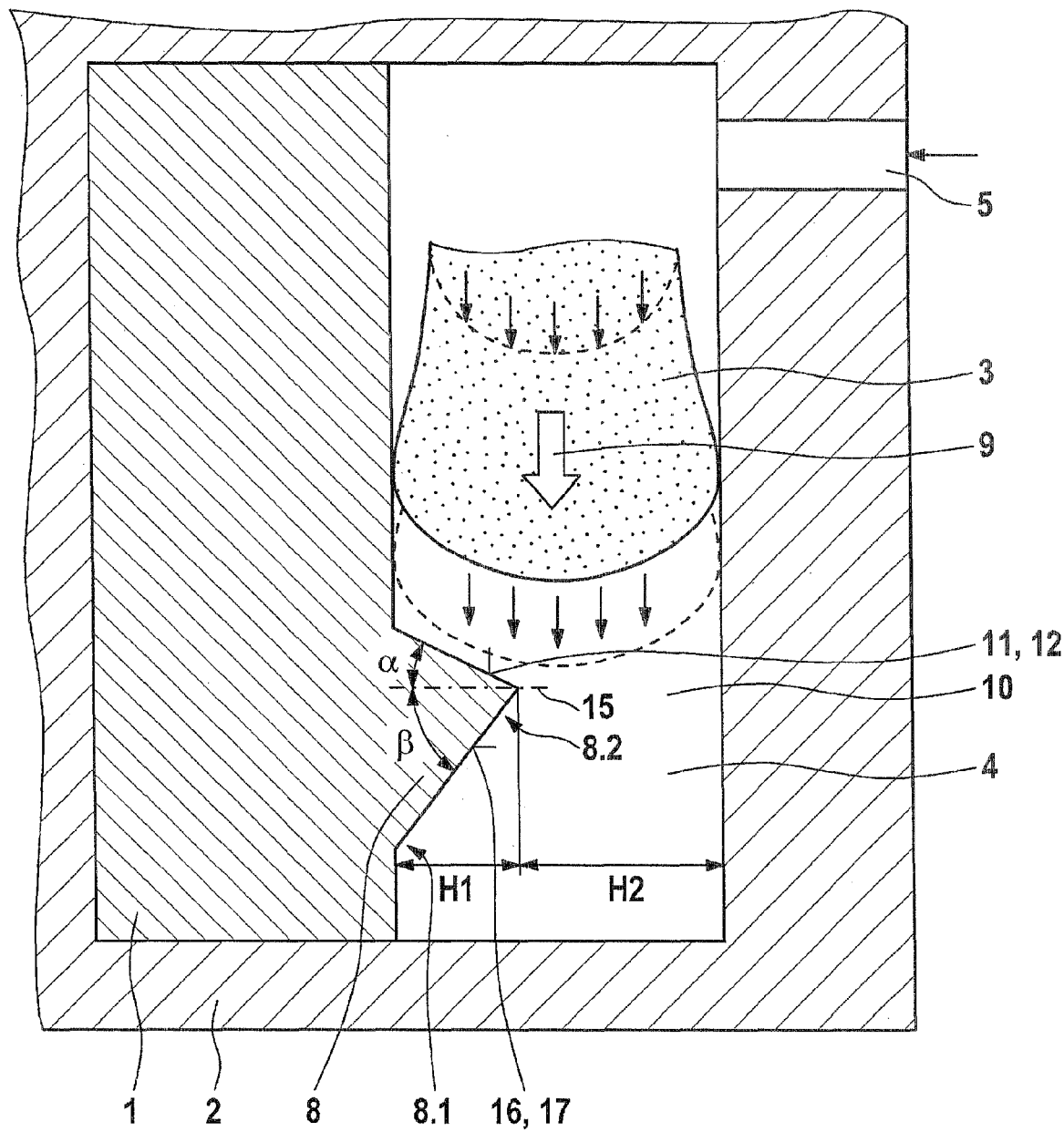
FIG. 1 is a sectional view of an injection-molded part of the invention in an injection mold during the injection molding operation.

FIG. 1 in section shows an injection-molded part of the invention in an injection mold during the injection molding operation.

In the production of plastic parts that comprise a plurality of parts or components, a gastight and/or liquid-tight connection of the parts with one another is increasingly important, especially for parts that carry oil or fuel. Form- and force-locking connections up to now have had the disadvantage that their tightness at high temperatures is not assured because of the diminishing prestressing forces. For stringent demands in terms of tightness, material-locking connections are necessary, in which the sealing faces are made to fuse continuously along at least a sealing line. Given sufficiently high diffusion resistance of the materials of the two composite partners, the requisite barrier function against the penetration of gases and/or liquids is obtained.

In the present invention, the material-locking connection is brought about by means of a multi-component injection-molding process.

In an injection molding operation, a composite element 3 is injection-molded onto an arbitrary solid inlay part 1 that is inserted into an injection mold 2 adapted to the inlay part 1. After the injection molding operation, the finished injection-molded part, comprising the inlay part 1 and the composite element 3 injection-molded onto it, is removed from the injection mold 2. Between the injection mold 2 and the inlay part 1, in predetermined injection attachment regions, a void 4 is provided, into which a plastic is injected via at least one injection attachment opening 5. The hot, molten plastic spills over the inlay part 1 in the injection attachment regions where the inlay part is locally fused. Because of the joint cooling of the inlay part 1 and the injected, solidifying melt that forms the composite element 3, a solid, fluid tight—for instance, gastight or fuel-tight—connection between the two partners is made.

The void 4 downstream of the raised feature 8 is designed to be as small possible, so as to reduce the amount of installation space required for the injection-molded part.

If higher-crystalline plastics are used, such as polyamide, PPS, POM or PEEK, for the inlay part 1 and/or the composite element 3, the problem is that for welding the two partners in the composite, not only must the local heating of the welding partner, that is, the inlay part 1, to melting temperature be accomplished, but the melting heat for the crystalline components of the inlay part 1 that are to be made to fuse must also be applied. With an increasing crystalline proportion of the plastic to be made to fuse, the melting enthalpies require multiple amounts of energy, compared to the heat required for purely material heating to melting temperature. The energy necessary for welding the inlay part 1 to the composite element 3 must be supplied from the melt to the place that is to be welded. However, the temperature of the melt must not exceed a predetermined temperature, so as not to thermally decompose or damage the melt.

For limiting the area of the inlay part 1 that is to be fused to a small region or regions, the inlay part 1 in the injection attachment regions has at least one raised feature 8, which forms a sealing line. Only the region at this sealing line has to be fused in order to attain fluid tightness. The at least one raised feature 8 has a foot region 8.1, toward the inlay part 1, and a head region 8.2, remote from the foot region 8.1; the head region is narrower, in a flux direction 9, than the foot region 8.1. The raised feature 8 begins to fuse first in the head region 8.2, because less material is present there and because new, hot melt is constantly being resupplied.

The at least one raised feature 8 has a height H1, measured perpendicular to the surface of the inlay part 1, and forms a constriction or a narrowed cross section 10 between the injection mold 2 and the inlay part 1. The remaining constriction 10 for the melt to spill over has a cross section that has the height H2.

The at least one raised feature 8 initially holds up the melt like a dam until the melt spills over as simultaneously as possible over its entire length and in the process is also fused over the entire length. During the spillover, the raised feature 8 is partly melted away, or in other words some of the material is removed, so that the original height H1 of the raised feature 8 decreases. Local fusing of the raised feature 8 at only one point of the melt and penetration of the raised feature 8 at that location must be avoided, since if they are not avoided, then under some circumstances the raised feature 8 may not spill over along its entire length and thus the necessary melting heat for the fusing is not furnished to every point. Therefore, the at least one raised feature 8 must have a minimum wall thickness viewed in the flux direction. Accordingly, the peak of the raised feature 8 must not be made too sharp or sharp-edged or too thin in the head region 8.2.

According to the invention, it is provided that the at least one raised feature 8 has a first chamfer 12 on its flux leading end 11. In this way, the melt is conducted from the foot region 8.1 into the head region 8.2. Because of the good flow guidance, a dead zone is not created on the flux leading end 11, and gas inclusions upstream of the flux leading end 11 are thus averted.

The first chamfer 12 of the at least one raised feature 8 has an angle $\alpha$ of between 5° and 45°, preferably between 15° and 35°, relative to an axis 15 standing perpendicular to the boundary face of the inlay part 1. The first chamfer 12 extends for instance from the foot region 8.1 into the head region 8.2. The raised feature 8 in FIG. 1 is embodied as triangular or in zigzag fashion in cross section as a result of the first chamfer 12 and the second chamfer 17. The peak of the raised feature 8 that is exposed to the melt may have a radius. The first chamfer 12 and/or the second chamfer 17 may be embodied as flat or curved.

In order to transport the necessary melting energy from the melt to the head region 8.2 of the raised feature 8, a predetermined constriction 10 is necessary, which is defined in general by the ratio of the height H2 of the constriction 10 to the height H1 of the raised feature 8. According to the invention, the ratio of H1 to H2 is in the range between 0.6 and 0.9.

The at least one raised feature 8 can have a second chamfer 17 on its flux trailing end 16. In this way, a free stream or a flow shadow with gas inclusions is avoided. The second chamfer 17 extends more shallowly than the first chamfer 12, to avoid the development of a free stream on the trailing edge of the raised feature. In one embodiment, the second chamfer 17 of the at least one raised feature 8 has an angle $\beta$ of between 50° and 75° relative to the axis 15.

The inlay part 1 is made from a first plastic and the composite element 3 is made from a second plastic; the first plastic and/or the second plastic has a crystalline proportion of at least 35%.

Figure 2:
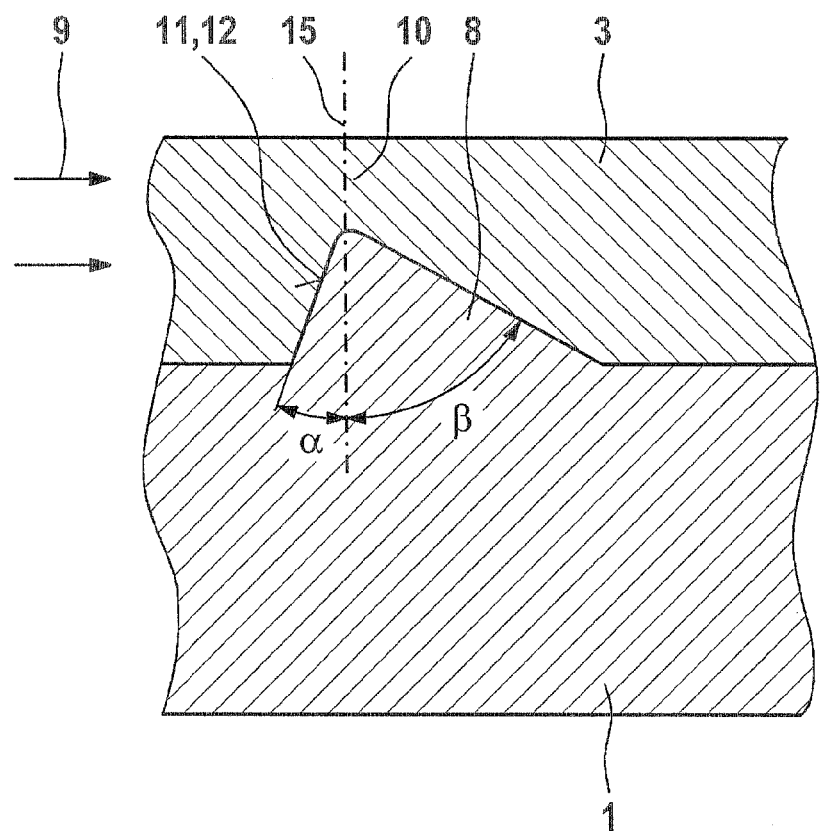
FIG. 2 is a sectional view of an injection-molded part of the invention after the injection molding operation.

FIG. 2, in section, shows an injection-molded part of the invention as in FIG. 1, after removal from the injection mold.

In the injection-molded part of FIG. 2, the parts that remain the same or function the same as in the injection-molded part of FIG. 1 are identified by the same reference numerals.

Figure 3:
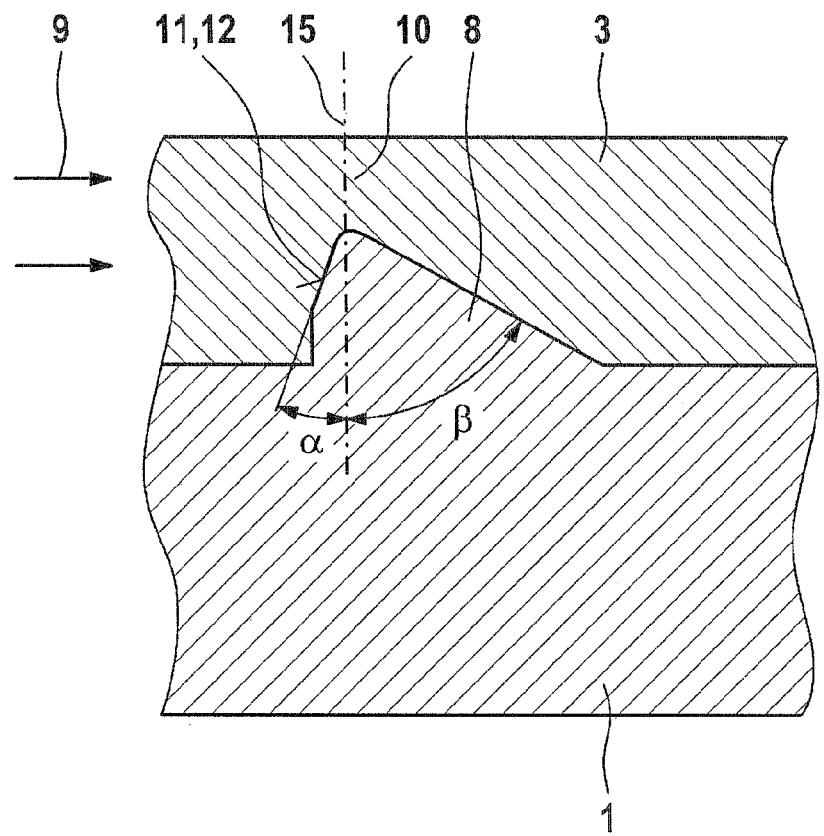
FIG. 3 is a sectional view of an injection-molded part of the invention in a second exemplary embodiment.

FIG. 3 in section shows an injection-molded part of the invention in a second exemplary embodiment.

In the injection-molded part of FIG. 3, the parts that remain the same or function the same as in the injection-molded part of FIGS. 1 and 2 are identified by the same reference numerals.

The second exemplary embodiment differs from the first exemplary embodiment of FIGS. 1 and 2 in that the flux leading end 11 in the foot region 8.1 extends approximately in the direction of the axis 15, and then the first chamfer 12 is embodied between the foot region 8.1 and the head region 8.2, as viewed in the direction of the axis 15.

Figure 4:
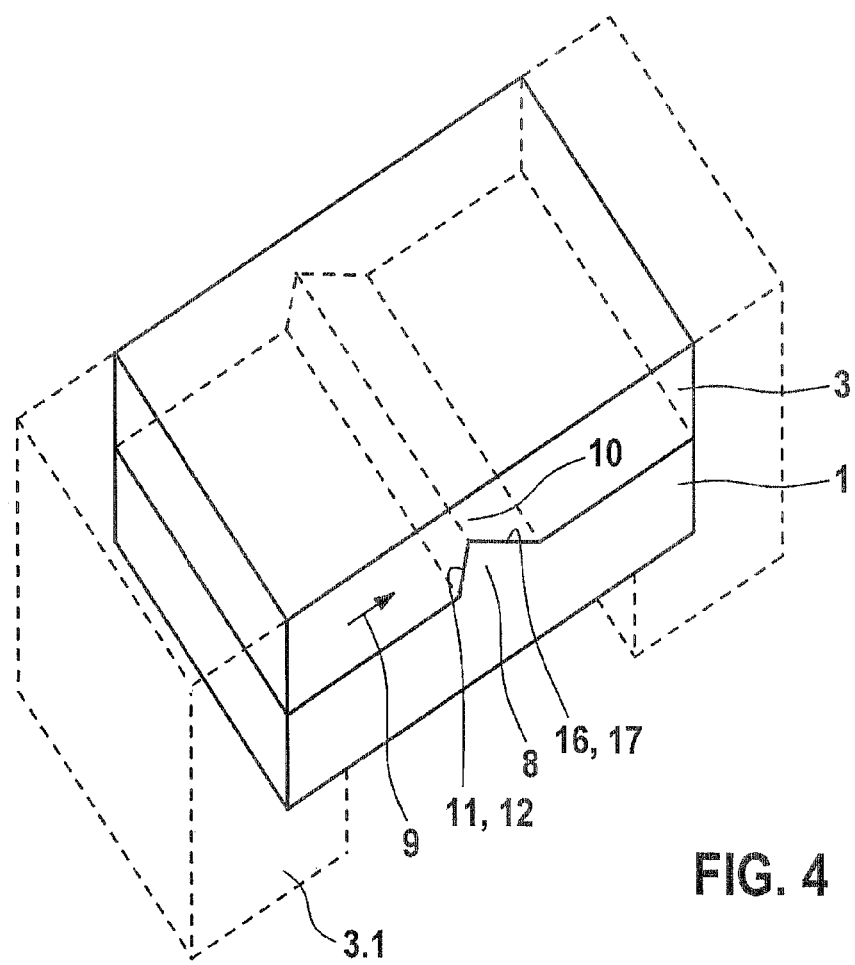
FIG. 4 is a three-dimensional view of a platelike injection-molded part of the invention.

FIG. 4 is a three-dimensional view of a platelike injection-molded part of the invention.

In the injection-molded part of FIG. 4, the parts that remain the same or function the same as in the injection-molded part of FIGS. 1 through 3 are identified by the same reference numerals.

In the case of an inlay part 1 that in at least some portions is platelike or disk like, one or more raised features 8 may be provided, which are embodied or disposed in linear, undulating, meandering or zigzag form. It may be provided that a plurality of raised features 8 are disposed one after the other in the flux direction 9. For attaining a fluid tight connection between the inlay part 1 and the composite element 3, however, a single raised feature 8 is sufficient.

In addition to the material-locking connection, a form-locking connection of the inlay part 1 and composite element 3 may be provided, for instance by having the composite element 3 engage the inlay part 1 from behind in clamp like or C-shaped fashion, as is represented by clamp portions 3.1 drawn in dashed lines. It is understood that the composite element 3 may also be anchored to the inlay part 1 in some other way than what is shown. By means of the additional form lock, the injection-molded part can be prestressed more strongly than in the case of a purely material-locking connection, so that tightness is assured even under very heavy mechanical and/or thermal loads.

Figure 5:
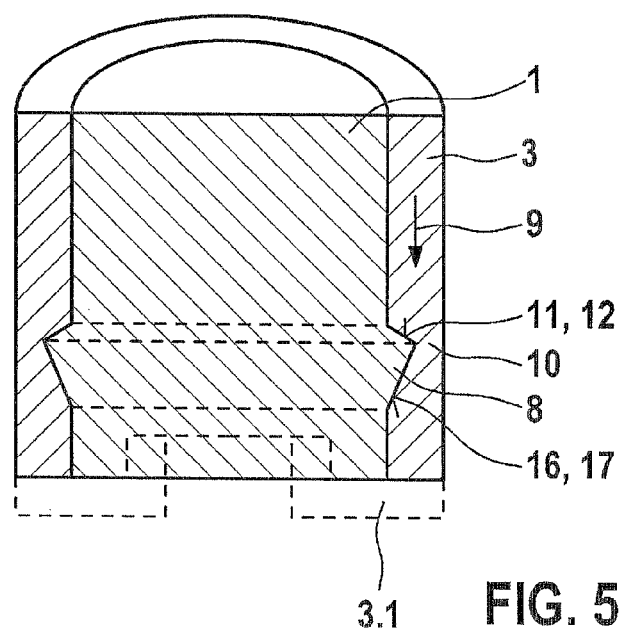
FIG. 5 is a three-dimensional view of a cylindrical injection-molded part of the invention.

FIG. 5 is a three-dimensional view of a cylindrical injection-molded part of the invention.

In the injection-molded part of FIG. 5, the parts that remain the same or function the same as in the injection-molded part of FIGS. 1 through 4 are identified by the same reference numerals.

In the case of a cylindrical inlay part 1, for instance, the raised feature 8 is embodied as extending annularly all the way around.

In addition to the material-locking connection, a form-locking connection of the inlay part 1 and composite element 3 may be provided, for instance by having the composite element 3 engage the inlay part 1 from behind in clamp like or C-shaped or anchor-shaped fashion, as is represented by clamp portions 3.1 drawn in dashed lines. It is understood that the composite element 3 may also be anchored to the inlay part 1 in some other way than what is shown.

For attaining a fluid tight connection between the inlay part 1 and the composite element 3, a single raised feature 8 extending annularly all the way around suffices, so that only little installation space is required for attaining the material-locking state. However, it is understood that a plurality of raised features 8 may also be disposed one after the other in the flux direction 9.

The foregoing relates to the preferred exemplary embodiments of the invention, it being understood that other variants and embodiments thereof are possible within the spirit and scope of the invention, the latter being defined by the appended claims.

The invention claimed is:

1. An injection-molded part, having at least one thermoplastic inlay part and one thermoplastic composite element injection-molded onto the inlay part, the at least one inlay part on its boundary face with the composite element having at least one raised feature for material-locking sealing between the inlay part and the composite element, which raised feature protrudes with a height into the composite element and forms a narrowed cross section in the composite element having a height, the at least one raised feature, on its flux leading end, having a first chamfer, and the ratio of the height of the narrowed cross section to the height of the raised feature is in the range between 0.6 and 0.9, wherein the at least raised feature has a second chamfer on its flux trailing end, and wherein the second chamfer extends more shallowly than the first chamfer.

2. The injection-molded part as defined by claim 1, wherein the first chamfer of the at least one raised feature has an angle between 5° and 45° relative to an axis that is perpendicular to the boundary face of the inlay part.

3. The injection-molded part as defined by claim 1, wherein the first chamfer of the at least one raised feature has an angle between 15° and 35° relative to an axis that is perpendicular to the boundary face of the inlay part.

4. The injection-molded part as defined by claim 1, wherein the second chamfer of the at least one raised feature has an angle between 50° and 75° relative to an axis that is perpendicular to the boundary face of the inlay part.

5. The injection-molded part as defined by claim 1, wherein viewed in the flux direction, only a single raised feature is provided.

6. The injection-molded part as defined by claim 1, wherein a plurality of raised features are disposed in succession in the flux direction.

7. The injection-molded part as defined by claim 1, wherein the inlay part is produced from a first plastic and the composite element is produced from a second plastic, and the first plastic and/or the second plastic has a crystalline proportion of at least 35%.

8. The injection-molded part as defined by claim 1, wherein the composite element is joined in form-locking fashion to the inlay part via a clamp portion.

9. The injection-molded part as defined by claim 1, wherein the first chamfer of the at least one raised feature has an angle between 5° and 45° relative to an axis that is perpendicular to the boundary face of the inlay part.

10. The injection-molded part as defined by claim 1, wherein the first chamfer of the at least one raised feature has an angle between 15° and 35° relative to an axis that is perpendicular to the boundary face of the inlay part.

11. An injection-molded part, having at least one thermoplastic inlay part and one thermoplastic composite element injection-molded onto the inlay part, the at least one inlay part on its boundary face with the composite element having a single raised feature for material-locking sealing between the inlay part and the composite element, the single raised feature having a first chamfer on a flux leading end, wherein the single raised feature has a second chamfer on its flux trailing end, and wherein the second chamfer extends more shallowly than the first chamfer.

12. The injection-molded part of claim 11, wherein the single raised feature protrudes with a height into the composite element and forms a narrowed cross section in the composite element having a height.

13. The injection-molded part of claim 11, wherein the first chamfer of the single raised feature has an angle between 5° and 45° relative to an axis that is perpendicular to the boundary face of the inlay part.

14. The injection-molded part of claim 11, wherein the first chamfer of the single raised feature has an angle between 15° and 35° relative to an axis that is perpendicular to the boundary face of the inlay part.

15. The injection-molded part as defined by claim 11, wherein the second chamfer of the single raised feature has an angle between 50° and 75° relative to an axis that is perpendicular to the boundary face of the inlay part.

16. The injection-molded part as defined by claim 11, wherein the inlay part is produced from a first plastic and the composite element is produced from a second plastic, and the first plastic and/or the second plastic has a crystalline proportion of at least 35%.

17. The injection-molded part as defined by claim 11, wherein the composite element is joined in form-locking fashion to the inlay part via a clamp portion.

18. The injection-molded part as defined by claim 11, wherein the ratio of the height of the narrowed cross section to the height of the single raised feature is in the range between 0.6 and 0.9.

* * * * *